United States Patent
Shah et al.

(10) Patent No.: US 12,038,894 B2
(45) Date of Patent: Jul. 16, 2024

(54) EVALUATING ROW-STORE EXPRESSIONS ON A COLUMN-STORE DATABASE

(71) Applicant: Google LLC, Mountain View, CA (US)

(72) Inventors: Viral Shah, Cupertino, CA (US); Xun Cheng, Dublin, CA (US); Xiaobin Ma, Fremont, CA (US); Haoyu Huang, Sunnyvale, CA (US); Anjan Kumar Amirishetty, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/167,134

(22) Filed: Feb. 10, 2023

(65) Prior Publication Data

US 2023/0367751 A1 Nov. 16, 2023

Related U.S. Application Data (60) Provisional application No. 63/340,234, filed on May 10, 2022.

(51) Int. Cl.
*G06F 16/22* (2019.01)
*G06F 12/02* (2006.01)

(52) U.S. Cl.
CPC .......... *G06F 16/221* (2019.01); *G06F 12/023* (2013.01); *G06F 2212/152* (2013.01)

(58) Field of Classification Search
CPC . G06F 16/221; G06F 12/023; G06F 2212/152
See application file for complete search history.

(56) References Cited

U.S. PATENT DOCUMENTS

| 6,421,662 | B1 * | 7/2002 | Karten | G06F 16/2237 |
| 8,375,041 | B2 * | 2/2013 | Webster | G06F 16/24534 |
| | | | | 707/769 |
| 2003/0187864 | A1 * | 10/2003 | McGoveran | G06F 16/284 |
| | | | | 707/999.102 |
| 2014/0095519 | A1 * | 4/2014 | Liu | G06F 16/8373 |
| | | | | 707/769 |
| 2017/0091298 | A1 * | 3/2017 | Spyker | G06F 16/273 |

(Continued)

OTHER PUBLICATIONS

"4.2. Value Expressions Chapter 4. SQL Syntax", [online] [retrieved May 10, 2022]. Retrieved from the Internet: <URL: https://www.postgresql.org/docs/current/sql-expressions.html>, 5 pages.

(Continued)

*Primary Examiner* — Eliyah S. Harper
(74) *Attorney, Agent, or Firm* — Lerner David LLP (57) ABSTRACT

Aspects of the disclosure provide for natively executing row-store expression data structures on column-store databases without rewriting. A database management system (DBMS) configured as described herein can maintain a mapping of row-store results to addresses of where corresponding column data is stored. When executing operators, such as logical operators, comparison operators, and/or function operators of a received query expression, the DBMS can operate on the column data, rather than the individual rows. The DBMS can store the results generated by executing the column operators, for example on a stack, and record the row-store addresses to which the stored results correspond. The DBMS responds with a number of rows corresponding to the processed column data.

20 Claims, 6 Drawing Sheets

(56) References Cited

U.S. PATENT DOCUMENTS

| | | | | |
|---|---|---|---|---|
| 2017/0235848 | A1* | 8/2017 | Van Dusen | G06Q 10/101 |
| | | | | 705/12 |
| 2018/0074792 | A1* | 3/2018 | Goergens | G06F 16/2282 |
| 2020/0250188 | A1* | 8/2020 | McCracken | G06F 16/2322 |
| 2020/0320159 | A1* | 10/2020 | Matthews | C09K 5/10 |

OTHER PUBLICATIONS

"SQL Server Columnstore Performance Tuning", [online] [retrieved May 10, 2022]. Retrieved from the Internet: <URL: https://social.technet.microsoft.com/wiki/contents/articles/4995.sql-server-columnstore-performance-tuning.aspx>, 5 pages.

Teotia, Siddharth, "Columnar Databases and Vectorization", [online] Retrieved from the iInternet :<URL:https://www.infoq.com/articles/columnar-databases-and-vectorization/>, May 27, 2018, 12 pages.

International Search Report and Written Opinion for International Application No. PCT/US2023/017835 dated Jun. 13, 2023. 11 pages.

Min et al. Improving In-memory Column-Store Database Predicate Evaluation Performance on Multi-core Systems. Computer Architecture and High Performance Computing (SBAC-PAD), 2010 22nd International Symposium On, IEEE, Piscataway, NJ, USA, Oct. 27, 2010 (Oct. 27, 2010), pp. 63-70.

Mishra et al. Accelerating Analytics With Dynamic In-Memory Expressions. Proceedings of the VLDB Endowment; [ACM Digital Library], Assoc. of Computing Machinery, New York, NY, vol. 9, No. 13, Sep. 1, 2016 (Sep. 1, 2016), pp. 1437-1448.

Schaffner et al. A Hybrid Row-Column OLTP Database Architecture for Operational Reporting. Business Intelligence for the Real-Time Enterprise ; Second International Workshop, Birte 2008, Auckland, New Zealand, Aug. 24, 2008 (Aug. 24, 2008), pp. 1-14.

* cited by examiner

EVALUATING ROW-STORE EXPRESSIONS ON A COLUMN-STORE DATABASE

CROSS-REFERENCE TO RELATED APPLICATIONS

The present application claims the benefit of the filing date of U.S. Provisional Patent Application No. 63/340,234, filed May 10, 2022, the disclosure of which is hereby incorporated herein by reference.

BACKGROUND

A database management system (DBMS) is a system for managing one or more databases and for receiving and resolving queries to the managed databases. A DBMS can manage one or more tables or relations of data stored on one or more storage devices and forming part of one or more managed databases. The DBMS can read and write to individual rows or columns of the managed tables, including updating, deleting, and adding records.

A DBMS can store blocks of data representing tables of a database. A database may be a row-store database, in which expression trees representing operations of a received query are evaluated by a DBMS row-by-row, and the data is stored row by row, such that the first column of a row will be next to the last column of the previous row. In a column-store database, expression trees are evaluated column-by-column and the data is stored such that each row of a column will be next to other rows from that same column. An expression tree generated for a row-store database cannot be processed by a DBMS for a column-store database, and vice versa. For example, a row-store expression tree, when executed, accesses values of columns within a single row, rather than columns of multiple rows. Therefore, a row-store expression tree cannot be used as a drop-in option for a column-store database. As a result, a DBMS for a column-store database rewrites the expression trees to handle columnar data.

BRIEF SUMMARY

Aspects of the disclosure provide for natively executing row-store expression data structures on column-store databases, without rewriting the expression data structure. A database management system (DBMS) configured as described herein can maintain a mapping of row-store results to addresses of where corresponding column data is stored. When executing operators, such as logical operators, comparison operators, and/or function operators of a received query expression, the DBMS can operate on the column data, rather than the individual rows. The DBMS can store the results generated by executing the column operators, for example on a stack, and record the row-store addresses to which the stored results correspond. The DBMS responds with a number of rows corresponding to the processed column data.

Aspects of the disclosure include a method including receiving, by one or more processors, a query for data maintained in a column-store database; generating, by the one or more processors, an expression tree representing the received query, the expression tree comprising one or more row-store operators for performing operations on a row-store database; and retrieving, by the one or more processors and using the expression tree, at least a portion of one or more rows in response to the received query, the one or more rows including column-store data from the column-store database.

Other aspects of the disclosure include a system including one or more processors configured to perform methods for evaluating row-store expression trees on column-store databases. Aspects of the disclosure also provide for computer-readable storage media encoding with instructions that when executed by one or more processors, causes the one or more processors to perform one or more methods for evaluating row-store expression trees on column-store databases, for example as described herein.

In some examples, retrieving at least a portion of the one or more rows includes generating a mapping between memory addresses of target addresses for each of the one or more row-store operators to a respective target address for storing a corresponding column-store result for executing the row-store operator.

In some examples, generating the mapping includes launching a virtual machine comprising stack memory, the virtual machine configured to maintain the mapping.

In some examples, retrieving at least a portion of the one or more rows can include: accessing a column value by at least partially executing a row-store operator in the expression tree, wherein accessing the column value comprises returning a value in the column-store database.

In some examples, retrieving at least a portion of the one or more rows can include executing a row-store function operator of the one or more row-store operators in the expression tree and targeting a column value, including executing a corresponding column-store function operator on the column including the column value.

In some examples, retrieving at least a portion of the one or more rows can include storing intermediate results generated from executing the one or more row-store operators in one or more virtual columns.

Aspects of the disclosure include a system including one or more processors configured to perform one or more methods disclosed herein.

Aspects of the disclosure include one or more non-transitory computer-readable storage media encoding instructions, which when executed by one or more processors, causes the one or more processors to perform one or more methods described herein.

DETAILED DESCRIPTION

In databases, expression trees can be used to evaluate predicate, projection, and aggregate expressions for a query.

In a row-store database, the expression trees for a query or other input are evaluated row-by-row and cannot be used for column-store databases. Column-store databases rewrite the expression trees to handle the columnar data. There is no drop-in option for column-store databases to use the expression trees generated for the row-store data. A drop-in option can refer to the ability for a DBMS managing a column-store database to implement functionality for row-store database management, without modifying the implementation of the functionality to account for the differences between row-store and column-store databases.

Aspects of the disclosure provide for natively executing row-store expression data structures on column-store databases, without rewriting the expression data structure to a column-store format. A database management system (DBMS) can maintain a mapping of row-store results to addresses of where corresponding column data is stored. When executing operators, such as logical operators, comparison operators, and/or function operators of a received query expression, the DBMS can operate on the column data, rather than the individual rows. The DBMS can store the results generated by executing the column operators, for example on a stack, and record the row-store addresses to which the stored results correspond. The DBMS responds with a number of rows corresponding to the processed column data.

Aspects of the disclosure provide for a virtualization technique for enabling the execution of row-store expression trees on column-store data. An interceptor virtual machine (VM) can maintain a mapping of row-store results of a received expression tree to the addresses where the column data is stored in the column-store database. Operators of the query represented in the expression tree, e.g., logical, comparison, or function operators, are executed on column data, rather than individual rows. The interceptor VM stores results generated by column operators on a stack and records the row-store addresses to which they correspond.

When the DBMS executes an operator requiring input operands, the DBMS can provide the operands from column data. The DBMS can look up a map of the row-store results and provide access to the corresponding column data. The DBMS generates a row-store expression tree or other analogous data structure for tracking what operands correspond to which parts of one or more executed operators. The result of executing the row-store expression tree on column data can be a result array. The values of the result array may be returned by an iterator implemented by the DBMS. In this way, the need to rewrite the expression tree for columnar data is eliminated.

Aspects of the disclosure can provide for at least the following advantages. The need to rewrite expression trees for columnar databases is eliminated. Existing row-store expression services can be dropped-in to a DBMS managing column-store data, without having to first rewrite the service to natively support column-store data. Further, improvements to row-store expression tree generation and execution also have a direct improvement to column-store data-based DBMSs, at least because of functionality and improvements extended from the row-store-based operators and column-store data-based operators. Expression processing can be applied to a variety of different trees, including predicate, projection, and aggregate expression trees.

Figure 1:
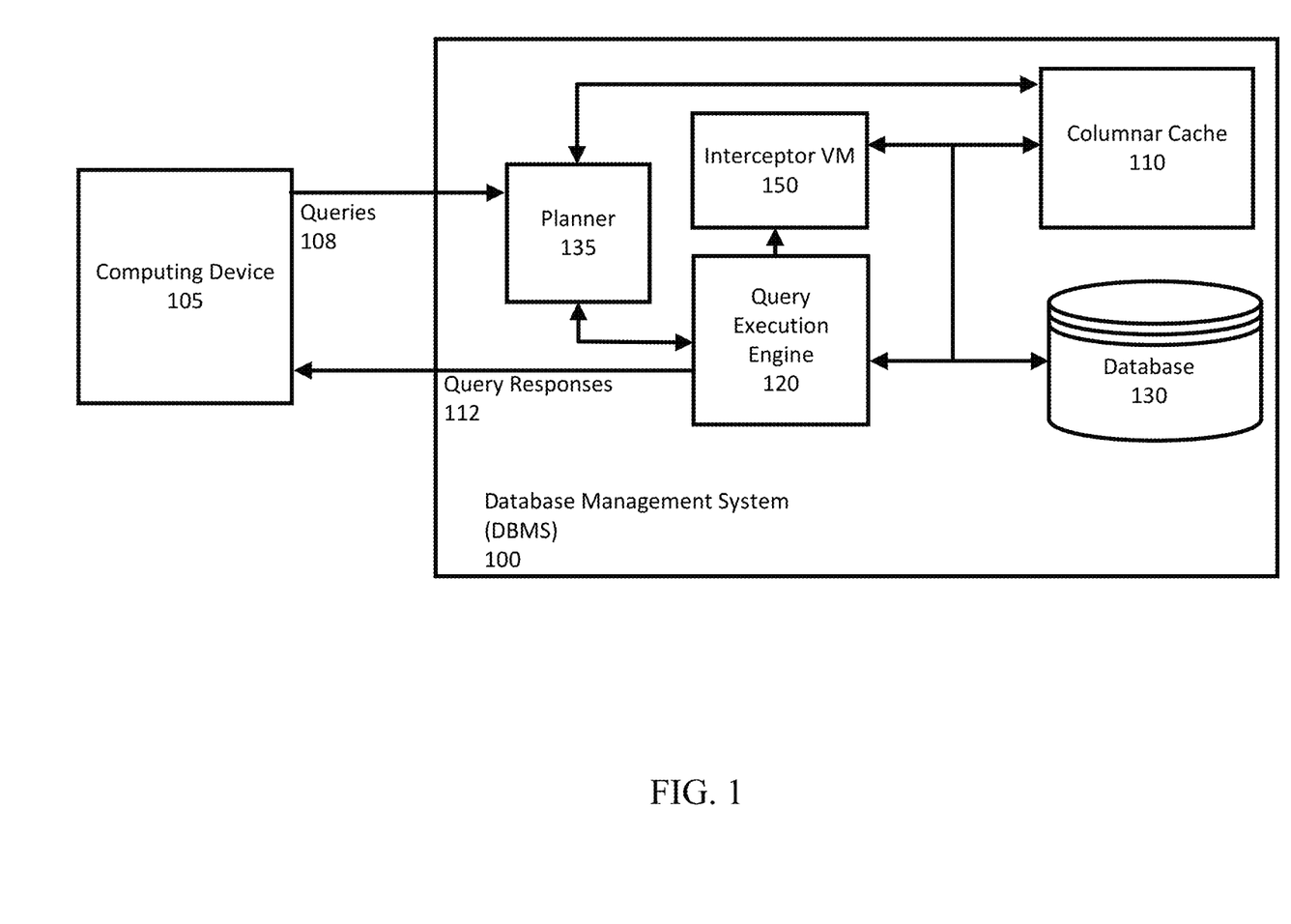
FIG. 1 is a block diagram of an example database management system (DBMS) configured to execute row-store expression trees on column-store data according to aspects of the disclosure.

FIG. 1 depicts a block diagram of an example database management system (DBMS) 100 configured to execute row-store expressions on column-store data, according to aspects of the disclosure. The DBMS 100 can be implemented on one or more computing devices in one or more physical locations. For example, the DBMS 100 can be configured for managing data on a computing platform of computing devices, which may include a number of computing devices and/or storage devices. The DBMS 100 can include an interceptor virtual machine (VM) 150, a columnar cache 110, a query execution engine 120, a database 130, and a planner 135.

The DBMS 100 can be configured to receive queries, such as queries 108 from computing device 105, and resolve queries by providing responses, such as query responses 112. A query response 112 can include one or more rows or columns, or portions of one or more rows or columns, of one or more tables of the database 130. Before providing the query response 112, the DBMS 100 can optionally process the data, for example by aggregating and/or sorting the rows of the response. Operations for processing the query response 112 can be provided as part of a received query 108, and/or be part of a predetermined pipeline that the DBMS 100 is configured to execute as part of resolving a query 108.

The computing device 105 can be any of a variety of computing devices configured for querying a database. For example, the computing device 105 can be a personal laptop, a server, a wearable device, a sensor, etc. The computing device 105 can be user-operated and include peripherals or other components for receiving user input. In other examples, the computing device 105 can be configured to automatically communicate with the DBMS 100, for example as part of executing a computer program, script, or hardware/firmware operation by the computing device 105. The DBMS 100 and the computing device 105 can communicate over a network and/or any of a variety of different types of wired or wireless connections.

In some examples, the DBMS 100 can be a hybrid transactional and analytical processing system (HTAP). An HTAP system is a database management system configured to perform both online transaction processing (OLTP) and online analytical processing (OLAP). OLTP systems are configured to coordinate and execute transactions between communicating computing devices. Transactions are recorded and updated in a corresponding database managed by an OLTP system. OLAP systems are configured to receive and resolve queries to a database used as part of analysis of data stored in the database. OLAP and OLTP systems are separately optimized for their respective use cases, with OLAP systems generally optimized for read-only access of data, and OLTP systems optimized for read and write access of queried data.

To improve the performance of query resolution, the DBMS 100 can implement the columnar cache 110. Queries to OLAP systems and HTAP systems supporting OLAP may include requests for data referenced by columns of tables in the database, as opposed to references to individual rows, which is more common in OLTP. To speed up resolution of queries by column, the DBMS 100 can implement the columnar cache 110.

The columnar cache 110 can be implemented asynchronously, so occasionally the columnar cache 110 can contain stale data, such as invalidated blocks. At least for some applications, such as HTAP systems, the DBMS 100 should answer queries 108 and at the same time accept updates to base tables from which data is cached. The DBMS 100 can implement a hybrid query execution to allow for the use of asynchronous columnar caches, by allowing for the execution of queries 108 for which data is retrieved from both the columnar cache 110 and the database 130. It is understood that the column data retrieved during execution of row-store expression trees as described herein can be retrieved from a combination of the column-store database 130 and/or the columnar cache 110.

Figure 2:
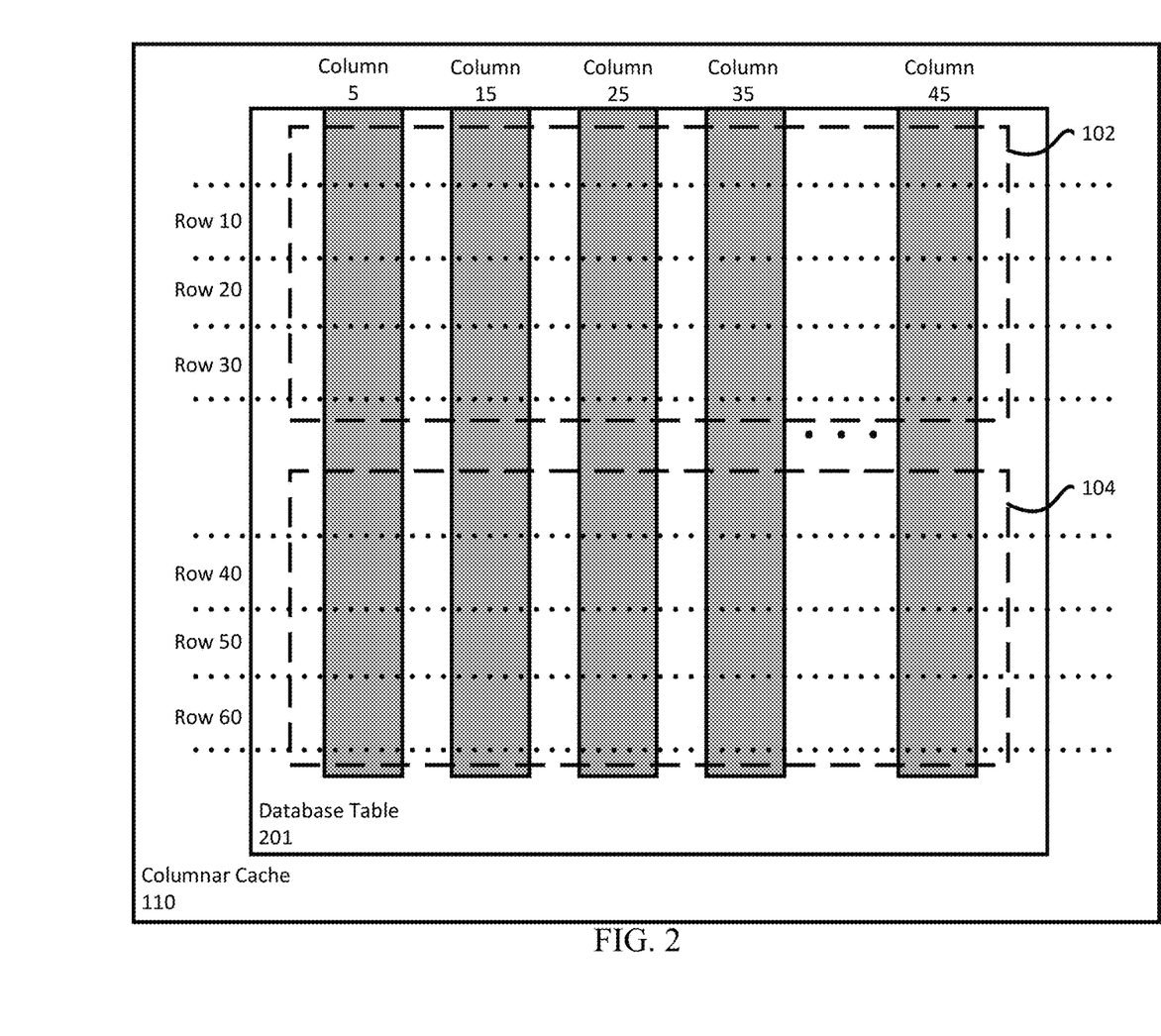
FIG. 2 is a block diagram of the columnar cache with cached data according to aspects of the disclosure.

FIG. 2 depicts a block diagram of the columnar cache 110 with cached data. In FIG. 2, the columnar cache 110 is shown as caching portions of a database table 201. Columns 5, 15, 25, 35, and 45 in the columnar cache 110 can be referenced using a respective table fragment index and a row index. A group of rows can form a block of data. Each block of data 102, 104 has a respective index. Within each block 102, 104, each row of the table fragment has a respective row index. Each row, such as row 10, row 20, and row 30, of block 102 can be referenced according to a respective row index. Similarly rows 40, 50, and 60 can be referenced according to a respective row index. Multiple blocks of data can be referred to as a table fragment. The number of blocks for a table fragment can vary from implementation-to-implementation depending on performance and overhead requirements, for example 4096 blocks each. It should be noted that the columnar cache 110 can include any number of rows, columns, blocks, table fragments, etc., and the number of elements shown in FIG. 2 is for example purposes only.

The columnar cache 110 can include any of a variety of different types of memory devices used for caching data. For example, the columnar cache can be implemented in main memory, such as RAM or DRAM. In addition, or alternatively, the columnar cache 110 can be implemented in persistent storage, such as on a solid-state drive or on a hard drive, on a local machine and/or on remote servers across a network.

Referring back to FIG. 1, the database 130 can be a collection of tables or relations storing data along multiple dimensions. For example, a table of the database 130 can store data along rows and columns of the table. The database 130 can be implemented on storage devices, such as directed attached storage devices, including solid state drives, hard drives, flash drives, network attached storage devices, arrays of various combinations of different or the same storage devices, etc. The database 130 can be a column-store database.

The query execution engine 120 can be configured to receive queries 108 and generate query responses 112. The queries 108 can be part of a workload executed by the computing device 105, or some other device not shown. A workload can refer to one or more computer programs or scripts that include operations for querying the DBMS 100 for data. A workload can be automatic and on-going, or executed during pre-programmed intervals of time. In other examples, a workload is executed on-demand by the computing device 105, for example in response to user input to the device 105.

A query 108 to the DBMS 100 can include data specifying columns of data to be retrieved from the DBMS 100. The specified data can be stored in the columnar cache 110 or in the database 130 at the time of execution. The query execution engine 120 can be configured to retrieve the queried data specified in a given query 108 and return the data as part of a query response 112.

The DBMS 100, as part of resolving the query 108, is configured to generate a query execution plan. The DBMS 100 can include a planner 135 or communicate with a planner external to the DBMS 100. The planner 135 can generate a query execution plan according to any of a variety of different processes. As part of generating the query execution plan, the planner 135 can parse a received query 108 and select corresponding query operations to execute according to the plan, based on a number of predetermined criteria. The predetermined criteria can be, for example, based on efficient use of compute or storage resources, number of operations to perform, total time to execute the query 108, user input specifying certain types of operations to perform, etc. The planner 135 can receive and parse a query 108 to generate a query execution plan.

A query operation can refer to an action performed by the query execution engine 120 as part of executing or resolving the received query 108. A query operation can include reading or writing data from and to memory, performing arithmetic or logic calculations, performing a respective process for sorting, hashing, joining, aggregating, and scanning data, etc. The query execution plan can be a directed graph, such as an expression evaluation tree, of nodes representing different operations to be performed by the DBMS 100 as part of executing the query 108. The query execution plan can also be represented as an ordered list or array of operations, based on the order in which the operations of the plan must be executed to correctly execute the received and parsed query 108.

Query responses 112 generated by the query execution engine 120 are returned to the computing device 105. In some examples, query responses 112 can be returned to another destination computing device (not shown) that can be specified as a destination by the computing device 105. The computing device 105 can proceed to process the query responses 112 as part of a downstream process, which can include subsequent queries to the DBMS 100 as part of the same or a different workload.

The DBMS 100 can communicate data between the computing device 105 and/or another computing device (not shown), using an interface, such as a graphic user instance, displayed on a display of the computing device 105. The interface can include a number of user-interactable elements, such as buttons, toggles, sliders, checkboxes, etc., for modifying the behavior of the DBMS 100 and/or displaying certain types of information, described presently. In other examples, the interface can include an API exposing the DBMS 100 for modifying different parameters related to the functionality of the DBMS 100, such as cache configuration, according to calls to the API.

Although reference is made to expression trees, it is understood that other data structures can be substituted for representing operators and operands for expressions of varying degrees of complexity and nested dependencies among operators. Operators which are keywords or phrases defined in the language and corresponding to certain operations that the DBMS is configured to perform. For example, the language may specify a JOIN operator for performing a table join for combining columns of selected tables to generate a new table. The columns may be specified by JOIN conditions, which the DBMS 100 is configured to identify in the query 108 to perform the join in accordance with the conditions specified in the query 108.

Interceptor VM 150 is configured to intercept the execution of row-store operators of a generated or received expression evaluation tree and substitute the operators with corresponding column-store operators. For example, join operators for row-store databases are replaced with column-store database join operators, and so on. An example pipeline for evaluating row-store expressions for column-store database 130 is provided with respect to FIGS. 3A-4 and TABLE 1.

Figure 3A:
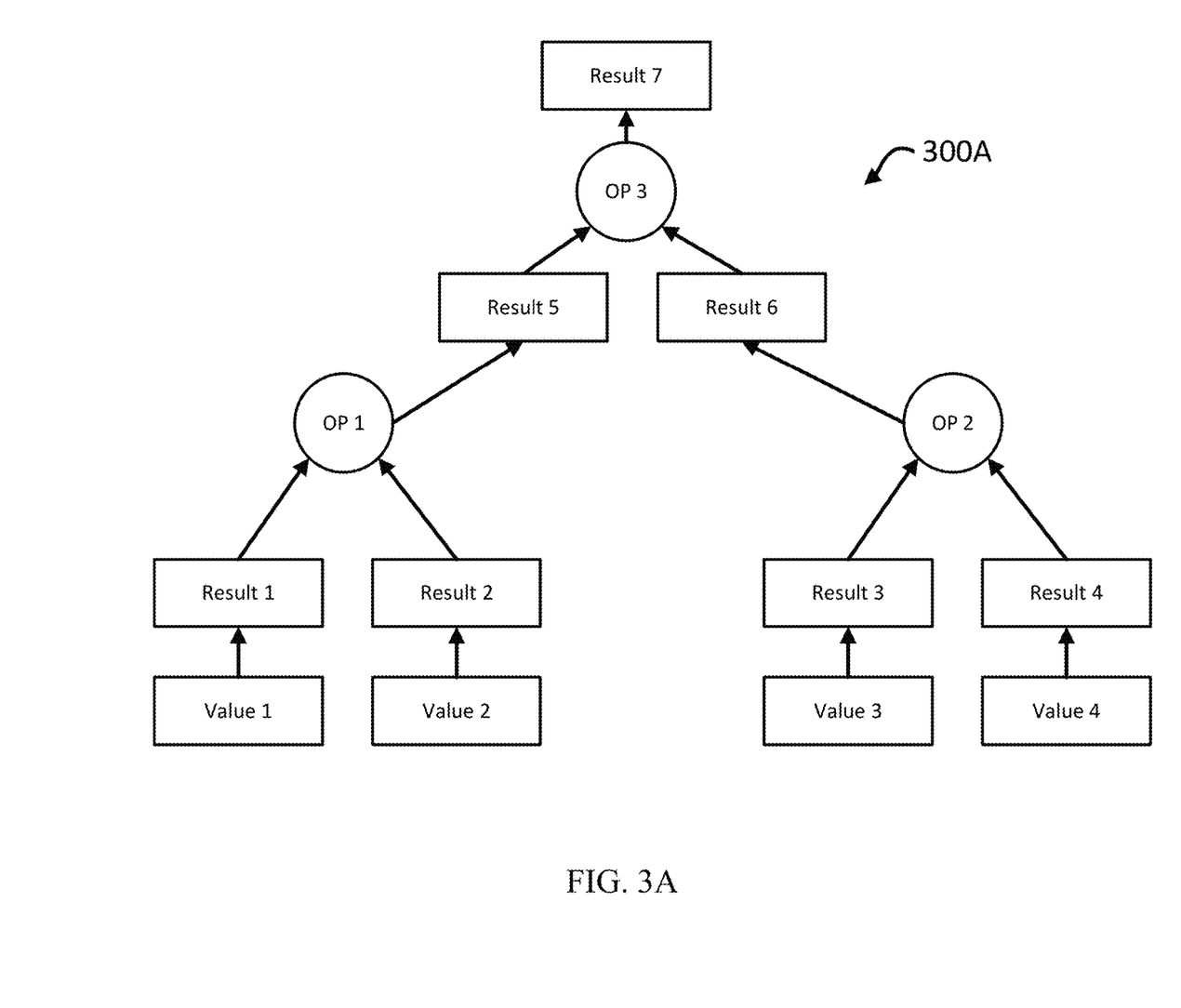
FIG. 3A is a diagram of an example row-store expression tree according to aspects of the disclosure.
Figure 3B:
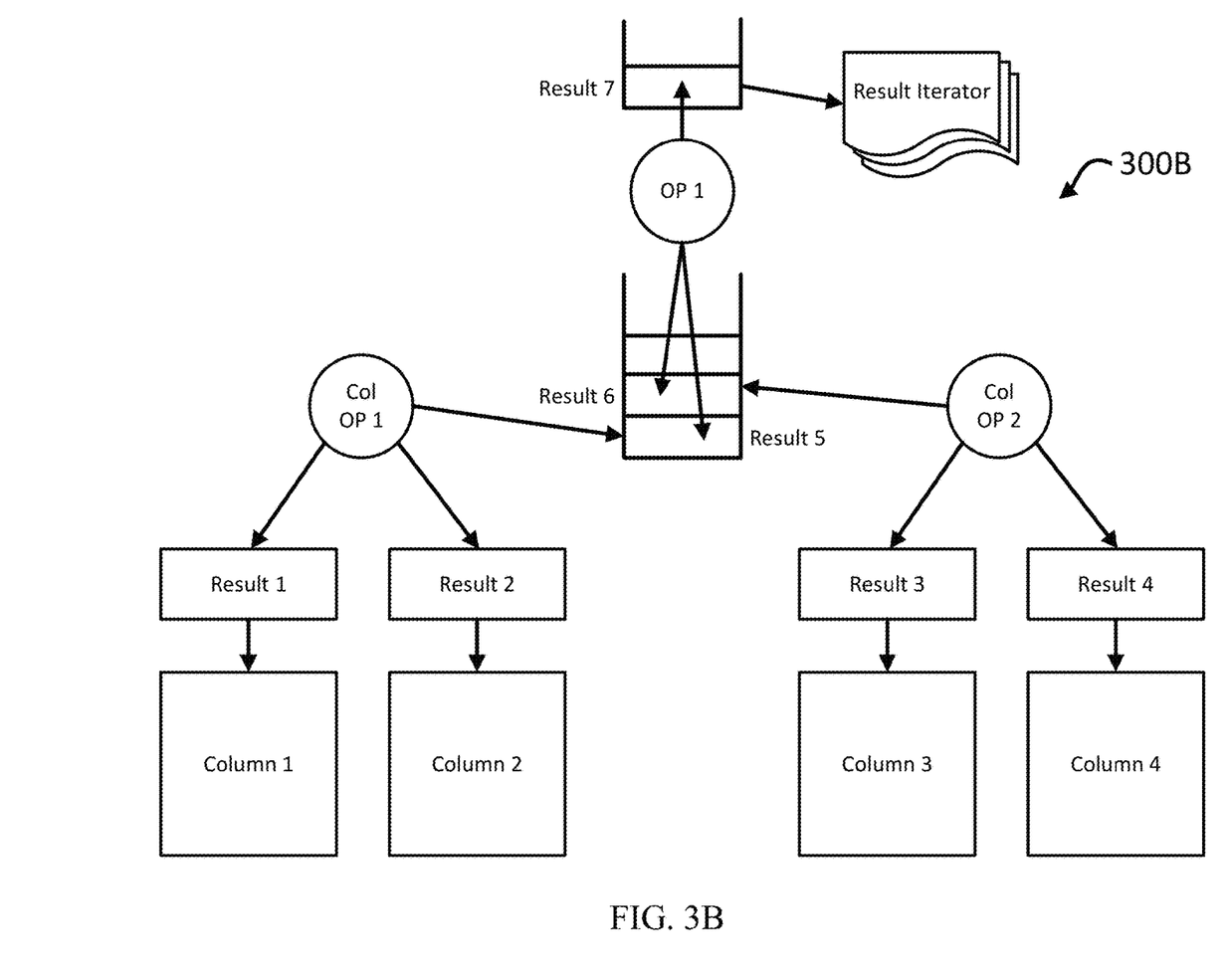
FIG. 3B is a diagram of an example evaluation of the row-store expression tree on a column-store database according to aspects of the disclosure.

FIG. 3A is a diagram of an example row-store expression tree 300A. expression tree 300A includes three operators, OP 1, OP 2, OP 3. The expression tree can be executed from the bottom-up. Values 1 and 2 can be retrieved to form results 1 and 2, respectively. OP 1 can be executed using results 1 and 2 to generate result 5. Similarly, values 3 and 4 can be retrieved to form results 3 and 4, respectively, OP 2 can be executed using results 3 and 4 to generate result 6. OP 3 can take results 5 and 6 as input and generate result 7 as output.

FIG. 3B is a diagram of an example evaluation 300B of the row-store expression tree 300A on a column-store database, according to aspects of the disclosure.

As shown in FIG. 3B, results 1 and 2 can be entire columns containing values 1 and 2, respectively. Column-store operators Col OP 1, Col OP 2, and Col OP 3, can correspond to the column-store operator equivalents of OP 1, OP 2, and OP 3 of FIG. 3A, respectively. Similarly, results 3 and 4 can correspond to the columns 3 and 4 storing the values 3 and 4 of FIG. 3A, respectively. Col OP 1 and Col OP 2 can be executed by the DBMS 100, and the respective results 5 and 6 can be pushed onto the stack of the interceptor VM 150. The DBMS 100 can execute Col OP 3 corresponding to OP 3 and push the result 7 to the stack. The results 1-7 can correspond to column data. The DBMS 100 can execute a result iterator to generate results row-by-row corresponding to the row-store expression tree 300A.

TABLE 1 is an example order of operations for evaluating row-store expression trees on a column-store database, according to aspects of the disclosure. A query execution engine 120 for the DBMS 100 can execute operators represented in an expression tree. The interceptor VM 150 can intercept execution of the expression tree to substitute targeted row-store data with corresponding column-store data, and the query execution engine 120 can execute column-store operators corresponding to row-store operators in an input expression tree.

TABLE 1

| | Row-Store (Query Execution Engine 120) | Virtual Machine Intercept (Interceptor 150) | Column Store (Query Execution Engine 120) |
|---|---|---|---|
| 1 | Read column value into a memory location | Map memory location to store column address | Nothing |
| 2 | Read column value from a memory location | Un-map memory location to get column address | Store column address in a memory location |
| 3 | Run logical operator (<, >, ==) using two memory locations and store result in an output memory location | 1. Un-map memory locations to get column addresses 2. Replace logical operator with columnar logical operator 3. Map output memory location to a stack memory location | 1. Read column addresses from memory locations 2. Perform Columnar operation 3. Store result vector on stack memory location |
| 4 | Run function operator (substr(a), trim(b)) using a memory location and store result in an output memory location | 1. Un-map memory location to get column address 2. Replace function operator with columnar function operator 3. Map output memory location to a stack memory location | 1. Read column address from memory location 2. Perform Columnar operation 3. Create Virtual Column 4. Store Virtual column address on stack memory location |
| 5 | Perform (3) and (4) recursively | Perform (3) and (4) recursively | Perform (3) and (4) recursively |
| 6 | Return a qualified row | 1. Read top stack memory for result vector 2. Construct iterator over result vector | 1. Return the top result from the iterator |
| 7 | Store sub-plan result into a memory location Where a = (select b from t where . . .) | 1. Iterate (1)-(6) | 1. Return the only result from iterator |
| 8 | Store aggregation (a + b) result into a memory location | 1. Un-map memory locations to get two column addresses 2. Replace agg function with columnar agg function 3. Map output memory location to a stack memory location | 1. Read column addresses from memory locations 2. Perform Columnar agg operation 3. Create Virtual Column 4. Store Virtual column address on stack memory location |

At step 1, the query execution engine reads a column value targeted by a row-store operator in an expression tree into a memory location, e.g., cache memory or other dedicated memory for evaluating the expression tree. The interceptor VM 150 maps the memory location to a corresponding column-store address.

At step 2, the query execution engine 120 reads a column value from a memory location. The interceptor VM 150 can un-map the memory location to retrieve the column address stored in step 1. The query execution engine 120 can store the corresponding column address in a location in memory, e.g., virtual memory.

At step 3, logical operators can be executed. Logical operators can include comparison operators, such as "is greater than," "is less than," or "is equal to." The row-store operator is executed using two memory locations, one for each operand. The result of the operator is stored in an output memory location. The interceptor VM 150 un-maps the memory locations to obtain corresponding column addresses in the column-store database 130. The logical operator is replaced with a columnar logical operator, e.g., a corresponding version of the row-store logical operator but for a column-store database 130. The output memory location is mapped to a stack memory location in the stack maintained by the interceptor VM 150. The DBMS 100 reads the column addresses from memory locations and performs the corresponding columnar operation for the logical operator. The resulting column data is stored at the stack memory location mapped to the output memory location from executing the row-store logical operator.

At step 4, the query execution engine 120 can execute function operators in an input expression tree. Example function operators include substring, trim, join, etc. The function operator is executed using a memory location specified as an operand in the expression tree, and the result is stored in an output memory location. The interceptor VM 150 un-maps the output memory location to retrieve the corresponding column address. The function operator is replaced with a columnar function operator corresponding to the function operator, and the output memory location is mapped to a stack memory location maintained by the interceptor VM 150. The query execution engine 120 reads the column address from the memory location and performs the columnar operation. The query execution engine 120 can create a virtual column and store the virtual column address at the stack memory location.

At step 5, steps 3 and 4 can be performed recursively. For example, expression trees with multiple nested operators are recursively processed. Steps 3 and 4 can be repeated for as many times as there are corresponding logical or function operators in the received expression tree.

At step 6, a qualified result row is returned in response to evaluating the expression tree. To do so, the interceptor VM 150 reads the top of the stack memory for a result vector of column data. The interceptor VM 150 constructs an iterator to return rows from the column data. The query execution engine 120 returns the top result of the iterator, e.g., a row or a portion of a row, and can iterate multiple times to return multiple rows in response to evaluating the expression tree.

For expression trees with nested operators, e.g., as shown and described with reference to FIGS. 3A-B, in step 7, the query execution engine 120 stores a sub-expression tree result into a memory location. The interceptor VM 150 can iterate steps 1-6 for as many sub-expression tree results as there are in the input expression tree. Step 7 is omitted for expression trees without sub-expression trees, e.g., having a single operator.

At step 8, aggregated results of executing an expression tree can be added together. For example, the query execution engine 120 can execute the left-hand side of the expression tree 300A of FIG. 3A, and then the right-hand side. The results of executing the opposite sides can be added together, e.g., using a merge or join operator represented by Col OP 3, and the result stored in a memory location. The interceptor VM 150 un-maps memory locations to get two column addresses. The operator used to aggregate the separate sides of the expression tree is replaced with a columnar aggregation function. The output memory location of the aggregation is mapped to a stack memory location maintained by the interceptor VM 150. The query execution engine 120 can read the column addresses from the memory locations and perform the columnar aggregation operator. The query execution engine 120 can create a virtual column with the aggregated results and store the virtual column address on a stack memory location.

Figure 4:
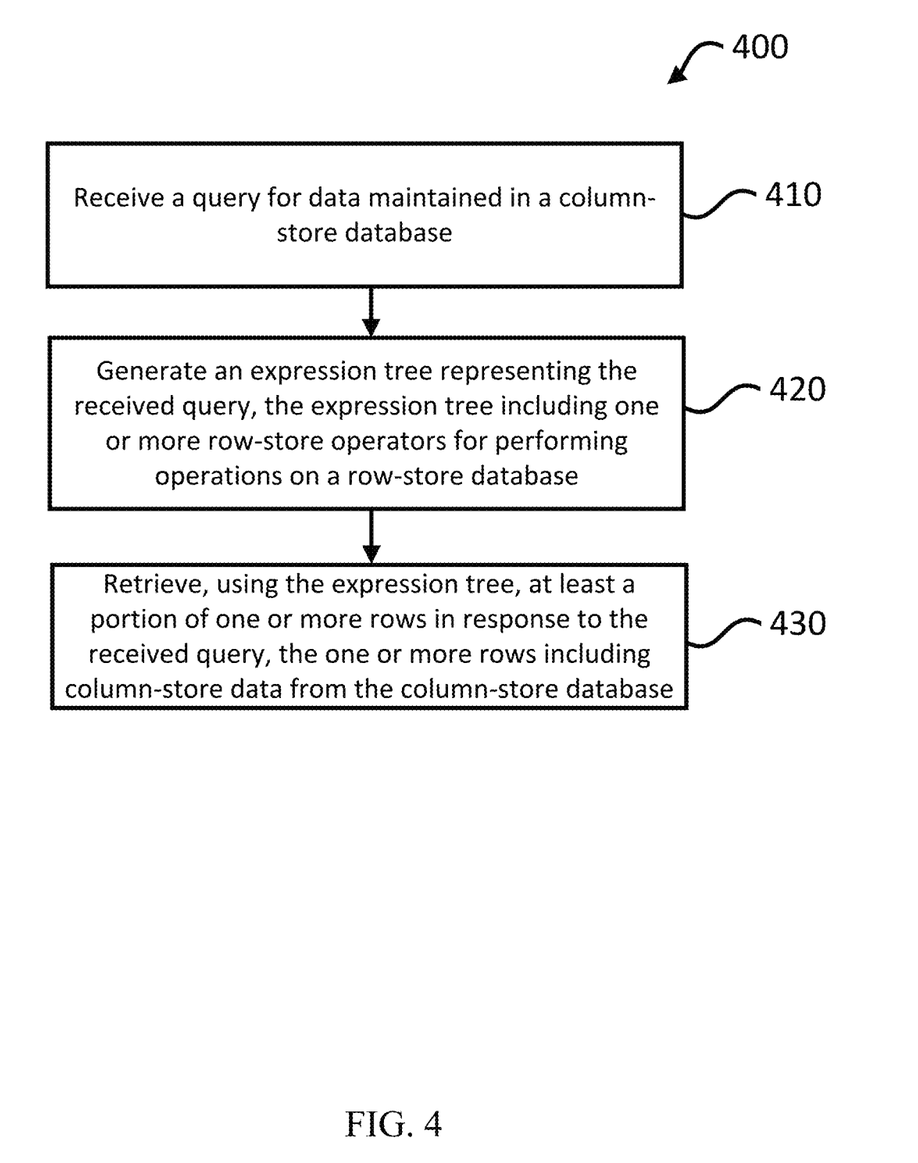
FIG. 4 is a flow diagram of an example process for evaluating row-store expression trees on a column-store database according to aspects of the disclosure.

FIG. 4 is a flow diagram of an example process 400 for evaluating expressions generated for a row-store database on a column-store database. The example process 400 can be performed on a system of one or more processors in one or more locations, such as the example DBMS 100 of FIG. 1.

The DBMS 100 receives a query 108 for data maintained in a column-store database 130, according to block 410.

The DBMS 100 generates an expression tree representing the received query 108, the expression tree including one or more row-store operators for performing operations on a row-store database, according to block 420. In some examples, instead of generating the expression tree, the DBMS 100 can receive the expression tree from another source.

According to block 430, the DBMS 100 retrieves, using the expression tree, at least a portion of one or more rows in response to the received query 108, the one or more rows including column-store data from the column-store database 130.

As part of retrieving the one or more rows or portions of one or more rows, the DBMS 100 can generate a mapping between memory addresses of target addresses for each of the one or more row-store operators to a respective target address for storing a corresponding column-store result for executing the row-store operator.

As part of generating the mapping, the DBMS 100 can launch a virtual machine, e.g., an interceptor VM 150 as described herein, including stack memory. The interceptor VM 150 can be configured to maintain the mapping.

Retrieving at least a portion of the one or more rows can include accessing a column value by at least partially executing a row-store operator in the expression tree, wherein accessing the column value comprises returning a value in the column-store database 130.

Retrieving at least a portion of the one or more rows can include executing a row-store function operator of the one or more row-store operators in the expression tree and targeting a column value, including executing a corresponding column-store function operator on the column comprising the column value.

Retrieving at least a portion of the one or more rows can include: storing intermediate results generated from executing the one or more row-store operators in one or more virtual columns.

Figure 5:
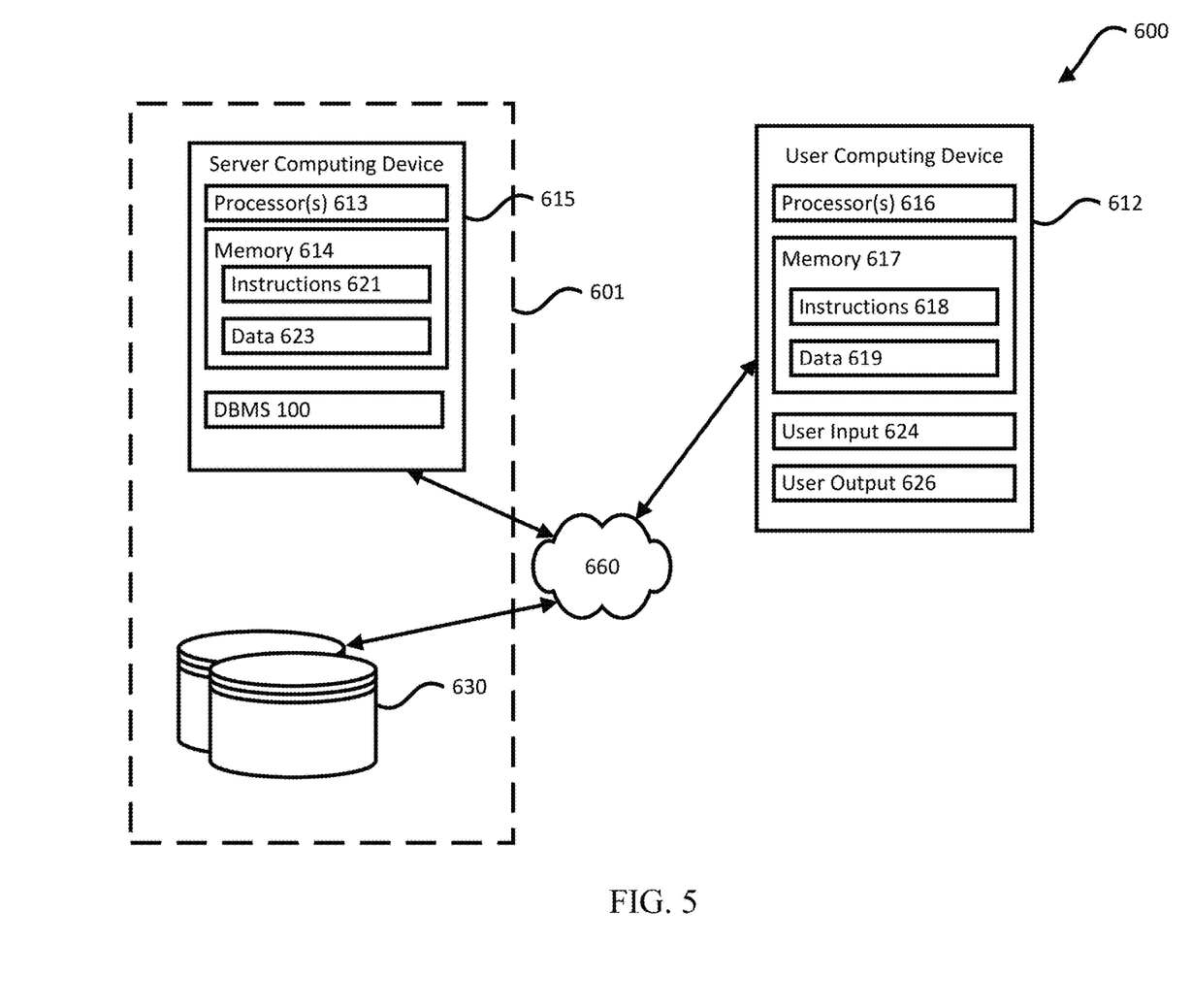
FIG. 5 is a block diagram of an example computing environment implementing the DBMS according to aspects of the disclosure.

FIG. 5 depicts a block diagram of an example computing environment 600 implementing the DBMS 100 that maintains transactional consistency in a columnar cache 110. The DBMS 100 can be implemented on one or more devices having one or more processors in one or more locations, such as in server computing device 615. User computing device 612 and the server computing device 615 can be communicatively coupled to one or more storage devices 630 over a network 660. The server computing device 615 and storage devices 630 can form part of a computing platform 601. The computing platform 601 can be a cloud computing platform, offering a variety of different services, for example for providing compute and storage resources to users of the platform.

The storage devices 630 can be a combination of volatile and non-volatile memory and can be at the same or different physical locations than the computing devices 612, 615. For example, the storage devices 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processors 613, including instructions 621 that can be executed by the processors 613. The memory 614 can also include data 623 that can be retrieved, manipulated, or stored by the processors 613. The memory 614 can be a type of non-transitory computer readable medium capable of storing information accessible by the processors 613, such as volatile and non-volatile memory. The processors 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processors 613, cause the one or more processors to perform actions defined by the instructions 621. The instructions 621 can be stored in object code format for direct processing by the processors 613, or in other formats including interpretable scripts or collections of independent source code modules that are interpreted on demand or compiled in advance. The instructions 621 can include instructions for implementing the DBMS 100 consistent with aspects of this disclosure. The DBMS 100 can be executed using the processors 613, and/or using other processors remotely located from the server computing device 615.

The data 623 can be retrieved, stored, or modified by the processors 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similarly to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 5 illustrates the processors 613, 616 and the memories 614, 616 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying target computing resources to be allocated for executing a neural network trained to perform a particular neural network task.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 660, in addition or alternatively, can also support wired connections between the devices 612, 615, including over various types of Ethernet connection.

Although a single server computing device 615 and user computing device 612 are shown in FIG. 7, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   receiving, by one or more processors, a query for data maintained in a column-store database;
   generating, by the one or more processors, an expression tree representing the query, the expression tree comprising one or more row-store operators for performing operations on a row-store database;
   generating, by the one or more processors, a mapping between the one or more row-store operators to corresponding column-store results for executing the row-store operators; and
   in response to the mapping, retrieving, by the one or more processors, at least a portion of one or more rows for the query, the one or more rows comprising column-store data from the column-store database.

2. The method of claim 1, wherein the mapping comprises a mapping between memory addresses for each of the one or more row-store operators to respective memory addresses for storing the corresponding column-store results.

3. The method of claim 1, wherein generating the mapping comprises launching a virtual machine configured to maintain the mapping.

4. The method of claim 1, further comprising accessing a column value by at least partially executing a row-store operator in the expression tree, wherein accessing the column value comprises returning a value in the column-store database.

5. The method of claim 1, further comprising executing a row-store function operator of the one or more row-store operators in the expression tree and targeting a column value.

6. The method of claim 5, further comprising executing a corresponding column-store function operator on the column comprising the column value.

7. The method of claim 1, further comprising storing intermediate results generated from executing the one or more row-store operators in one or more virtual columns.

8. A system, comprising:
   one or more processors; and
   one or more storage devices coupled to the one or more processors and storing instructions that, when executed by the one or more processors, cause the one or more processors to perform operations comprising:
      receiving a query for data maintained in a column-store database;
      generating an expression tree representing the query, the expression tree comprising one or more row-store operators for performing operations on a row-store database;
      generating a mapping between the one or more row-store operators to corresponding column-store results for executing the row-store operators; and
      in response to the mapping, retrieving at least a portion of one or more rows for the query, the one or more rows comprising column-store data from the column-store database.

9. The system of claim 8, wherein the mapping comprises a mapping between memory addresses for each of the one or more row-store operators to respective memory addresses for storing the corresponding column-store results.

10. The system of claim 9, wherein generating the mapping comprises launching a virtual machine configured to maintain the mapping.

11. The system of claim 8, wherein the operations further comprise accessing a column value by at least partially executing a row-store operator in the expression tree, wherein accessing the column value comprises returning a value in the column-store database.

12. The system of claim 8, wherein the operations further comprise executing a row-store function operator of the one or more row-store operators in the expression tree and targeting a column value.

13. The system of claim 12, wherein the operations further comprise executing a corresponding column-store function operator on the column comprising the column value.

14. The system of claim 8, wherein the operations further comprise storing intermediate results generated from executing the one or more row-store operators in one or more virtual columns.

15. A non-transitory computer readable medium for storing instructions that, when executed by one or more processors, cause the one or more processors to perform operations comprising:

receiving a query for data maintained in a column-store database;

generating an expression tree representing the query, the expression tree comprising one or more row-store operators for performing operations on a row-store database;

generating a mapping between the one or more row-store operators to corresponding column-store results for executing the row-store operators; and in response to the mapping, retrieving at least a portion of one or more rows for the query, the one or more rows comprising column-store data from the column-store database.

16. The non-transitory computer readable medium of claim 15, wherein the mapping comprises a mapping between memory addresses for each of the one or more row-store operators to a-respective memory addresses for storing the corresponding column-store results.

17. The non-transitory computer readable medium of claim 16, wherein generating the mapping comprises launching a virtual machine configured to maintain the mapping.

18. The non-transitory computer readable medium of claim 15, wherein the operations further comprise accessing a column value by at least partially executing a row-store operator in the expression tree, wherein accessing the column value comprises returning a value in the column-store database.

19. The non-transitory computer readable medium of claim 15, wherein the operations further comprise:

executing a row-store function operator of the one or more row-store operators in the expression tree and targeting a column value; and executing a corresponding column-store function operator on the column comprising the column value.

20. The non-transitory computer readable medium of claim 15, wherein the operations further comprise storing intermediate results generated from executing the one or more row-store operators in one or more virtual columns.

* * * * *